April 21, 1970      W. M. ALLISON      3,508,128
SERIES-CONNECTED CAPACITOR SECTIONS
Filed July 11, 1968
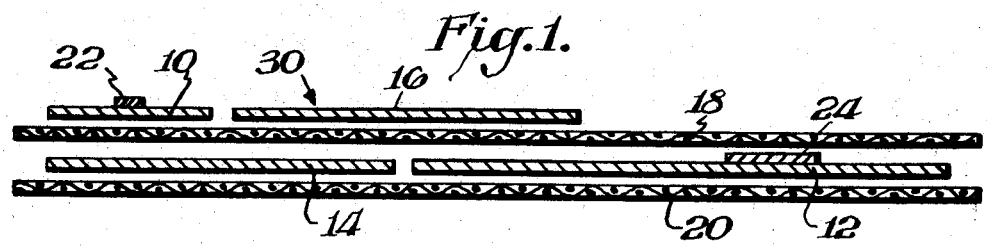
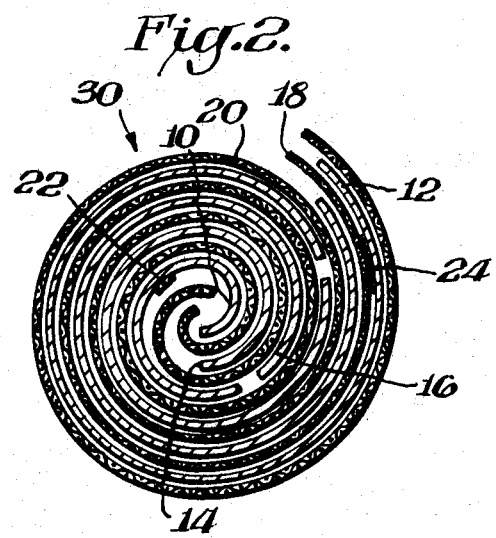
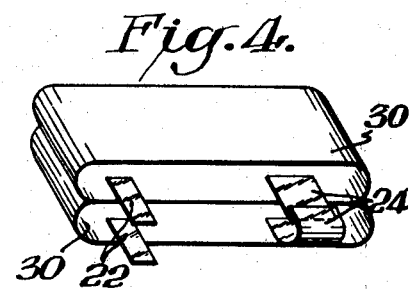
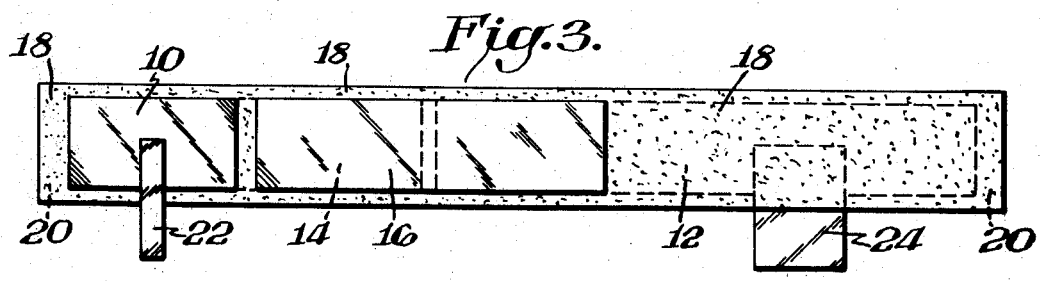
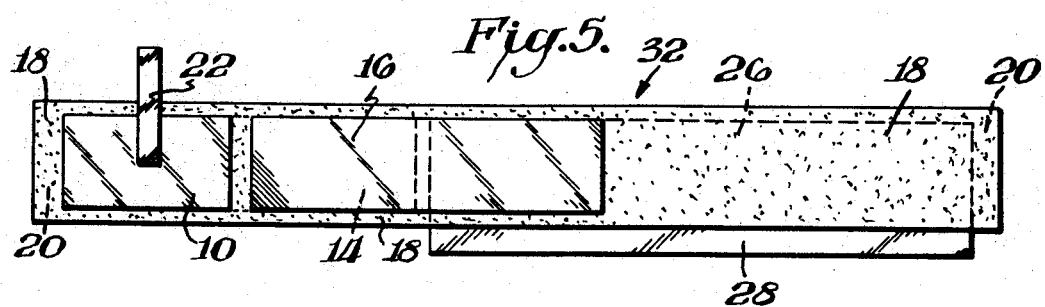

United States Patent Office 3,508,128
Patented Apr. 21, 1970

3,508,128
SERIES-CONNECTED CAPACITOR SECTIONS
William M. Allison, Williamstown, Mass., assignor to Sprague Electric Company, North Adams, Mass., a corporation of Massachusetts
Filed July 11, 1968, Ser. No. 744,160
Int. Cl. H01g 3/04, 3/175, 3/28
U.S. Cl. 317—258
9 Claims

ABSTRACT OF THE DISCLOSURE

Two rolled capacitor sections each have an inner electrode and an outermost electrode which by capacitive overlap are internally series-connected by at least one floating electrode. The outermost electrode overlaps itself and extends volutely at least a small distance beyond every other electrode. The two capacitor sections are series-connected by an electrical connection between the outermost electrode of each section.

Background of the invention

This invention is concerned with a series-connected pair of split-wound, internally series-wound capacitor sections. In internally series-connected capacitor windings of the prior art, no provision has been made for assuring that the outer foil of the sections will be at the same voltage to avoid a voltage stress between the sections. If voltage differences of sufficient magnitude between sections are involved then a serious corona problem may exist which could lead to failure of the unit.

It is a principal object of the present invention to present a novel capacitor construction designed to control voltage distribution throughout the assembly.

Another object of the invention is to present a pair of capacitor sections so designed and constructed that it is impossible for a voltage difference to appear across the dielectric between the two windings.

Summary of the invention

A series-connected pair of split-wound, internally series-wound capacitor sections has the following structure: Each section comprises an inner electrode and an outermost electrode having therebetween at least one floating electrode which internally series-connects by capacitive overlap said inner and outermost electrodes. The outermost electrode overlaps itself to at least some extent and extends volutely beyond every other electrode. The two sections are series-connected by an electrical connection between the outermost electrodes of each section. In order to identify the inner and outermost electrodes, coded electrically conductive means are in association with said electrodes. The term "coded" electrically conductive means is meant to include physically dissimilar electrically conductive means such as metal tabs of different shapes, or a tab and an extended-foil, or identical tabs distinctively marked, etc. In one specific embodiment, the dissimilar electrically conductive means are a narrow tab in association with the inner electrode and a comparatively wide tab in association with said outermost electrode. In order to series-connect the two sections the two wide metal tabs are placed in electrical connection. In another preferred embodiment, a metal tab is placed in association with the inner electrode and the outermost electrode has an extended-foil area in association therewith. Two rolled sections of this construction are series-connected by placing the extended foil areas of the outermost electrode in electrical communication.

Brief description of the drawing

FIGURE 1 is a side view in section of an unwound capacitor section of the present invention;
FIGURE 2 is a top view of the capacitor section of FIGURE 1 in its wound form;
FIGURE 3 is a plan view of the capacitor section of FIGURE 1;
FIGURE 4 is a perspective view of two series-connected capacitor sections of the present invention; and
FIGURE 5 is a plan view of another embodiment of the present invention.

FIGURE 1 shows a side view of unrolled capacitor section 30. Inner electrode 10 is separated from a first floating electrode 14 by a dielectric spacer 18. A second floating foil 16 is in capacitive overlap with floating foil 14 and with outermost electrode 12. A second dielectric spacer 20 separates electrodes 10 and 16 from electrodes 12 and 14 when the unit is rolled up. Inner electrode tab 22 is in asosciation with inner electrode 10 and electrode tab 24 is is association with outermost electrode 12. FIGURE 2 shows capacitor section 30 in its wound form and illustrates the fact that outermost electrode 12 overlaps itself at least to some extent and extends beyond the farthest peripherally extending floating electrode 16. FIGURE 3 shows a plan view of section 30 and FIGURE 4 shows two sections 30 placed in series-connection by means of an electrical connection betwen outer electrode tabs 24. FIGURE 5 shows a variation in the structure of one capacitor section 32 wherein outermost electrode 26 has an extended foil area 28 in association therewith.

Detailed description of the invention

Referring more specifically to the structure and assembly of the subject capacitor, to begin with, the winding of comparatively short inner electrode 10 and longer floating foil 14 is convolutely started together or floating foil 14 may be started first with one or two turns. These foils are separated by dielectric spacers 18 and 20. During the winding of this part of the capacitor section, a narrow electrode tab 22 is placed in electrical connection with inner electrode 10. After a predetermined number of turns electrode 10 is interrupted and, after a suitable space, it is continued as floating foil 16. The suitable space should be such that the corona starting voltage between the more or less adjacent edges of foils 10 and 16 is appreciably higher than the maximum operating voltage. As a general rule, this should be between about 10 and 500 times the total dielectric thickness between overlapping foils. After continuing the winding again for a certain predetermined number of turns, electrode 14 is interrupted and after a suitable space, as above, is continued as outermost electrode 12. Finally floating electrode 16 is ended and electrode 12 is continued volutely, but with dielectric spacers 18 and 20, so that it at least overlaps itself to some extent and extends beyond every other electrode. During the final turn or turns a wide electrode tab 24 is placed in electrical connection with electrode 12. The term "convolutely" is used in the usual sense as meaning two capacitively overlapped rolled electrodes. The term "volutely" is employed to define the continuation of the outer electrode at least once and beyond the other electrodes.

Two so-wound capacitor sections are pressed flat, as shown in FIGURE 4. Care is taken to insure a maximum distance between tabs 22 and 24. After oven-drying the units, they are impregnated with a suitable solid dielectric, such as Epocast 203 which is a Bisphenol A-acid anhydride cured polymer. Following impregnation the two sections are series-connected by electrically connecting the two wide electrode tabs 24. The unit is then ready for final assembly in any suitable prior art container.

EXAMPLE I

A series-connected pair of split-wound, internally series-wound capacitor sections within the scope of the present invention is prepared as follows: Two ¼ mil by ⁷⁄₁₆ inch aluminum foils are capacitively separated by two 1.3 mil by ¹¹⁄₁₆ inch strips of reconstituted mica paper. One of the foils is designated the "inner electrode" and the other is the first of two floating electrodes. Using a ¹³⁄₁₆ inch mandrel, the foils and the reconstituted mica strips are convolutely wound for three and one-half turns. At this point a ¼ inch wide piece of tab stock aluminum is placed in electrical connection with the inner electrode (electrode 10 of FIGURE 1) of the winding. The winding is continued for five and one-half more turns, at which point the inner electrode is interrupted for a space of one-half turn. At this point the interrupted foil is continued in the winding as the second floating electrode. After an additional seven and three-quarters turns, the first floating foil is interrupted for a space of one-half turn. At this point the second interrupted foil is continued as the outermost electrode. After five more turns a ¾ inch piece of tab stock is placed in electrical connection with the outermost electrode foil. The winding is then continued for two more turns, at which point the second floating electrode foil is ended. The winding of the outermost electrode foil is continued for one complete turn at which point it is terminated and the dielectric paper is continued for approximately two turns.

A second identical winding or section is then made. The two sections are pressed flat, care being taken to insure a maximum distance between the tab of the inner electrode and the tab of the outermost electrode. The two sections are placed together and the tabs of the outermost electrodes of each section are soldered together. This series-connects the two sections. Leads are soldered to the tabs on the inner electrode foil. Both capacitor sections are then impregnated with Epocast 203, which is a commercial Bisphenol A-epoxy acid anhydride cured polymer. The units are then ready for testing and final packaging in suitable prior art containers.

EXAMPLE II

Another series-connected pair of split-wound, internally series-wound capacitor sections within the scope of the present invention is prepared as in Example I except that the dielectric is ¼ mil Mylar (polyethyleneterephthalate) and the impregnant is a microcrystalline petroleum wax.

By eliminating the microcrystalline wax in the foregoing example the corona starting voltage is only about ten percent lower. Thus depending upon particular requirements, the units of the present invention may or may not be impregnated with a dielectric material.

When an impregnant is to be employed, other prior art impregnants as substitutes for those of the examples may be employed. These substitutes can be organic resins, waxes, oils, chlorinated oils and organic compounds, etc. The dielectric spacer material can be organic or inorganic films such as polycarbonates, polyesters, glass fiber, reconstituted mica paper, Mylar, woven cloth, polysiloxane films, polyimides, kraft paper, etc. The spacer may also be combinations of films or combinations of films and paper. The electrode foils herein contemplated are not limited to aluminum but may be zinc, tin-lead alloy, copper or other low resistance material.

While the specific example shows the inner electrode and the first floating electrode as beginning together in the section or winding, for convenience of handling the winding can be started with one or two turns of the first floating foil before insertion of the inner electrode. While the specific example shows the use of two floating foils, it is to be understood that the separate windings can have one or more floating foils.

As many widely different embodiments of this invention may be made without departing from the spirit and scope thereof, it is to be understood that invention is not limited to the specific embodiments hereof except as defined in the appended claims.

What is claimed is:

1. A series-connected pair of split-wound, internally series-wound capacitor sections wherein each section comprises an inner electrode and an outermost electrode having therebetween at least one floating electrode series-connecting by capacitive overlap said inner and outermost electroles; said outermost electrode overlapping itself and extending volutely beyond every other electrode so that a voltage difference will not appear across the dielectric between two series-connected sections; dielectric spacers capacitively separate said electrodes; said pair of sections being series-connected by an electrical connection between the outermost electrode of each section.

2. The capacitor sections of claim 1 wherein said inner and outermost electrodes are differentiable by coded electrically conductive means in association with sail electrodes and wherein the means in association with said outermost electrodes are in electrical communication with each other so as to effect a series-connection between said capacitor sections.

3. The capacitor sections of claim 2 wherein said coded electrically conductive means are comparatively narrow metal tabs in association with said inner electrodes and comparatively wide metal tabs in association with said outermost electrodes.

4. The capacitor sections of claim 2 wherein said coded electrically conductive means are metal tabs in association with said inner electrodes and extended-foil areas in association with said outermost electrodes.

5. The capacitor sections of claim 2 wherein the dielectric spacers are selected from the group consisting of organic and inorganic films.

6. The capacitor sections of claim 5 including an impregnant which is either liquid or solid at operating temperatures.

7. The capacitor sections of claim 6 wherein the dielectric spacers are reconstitutel mica paper and the dielectric impregnant is a Bisphenol A-epoxy polymer.

8. The capacitor sections of claim 5 wherein the organic film is polyethyleneterephthalate.

9. The capacitor sections of claim 8 including a microcrystalline petroleum wax.

References Cited

UNITED STATES PATENTS

| 1,911,064 | 5/1933 | Damarin | 317—258 X |
| 2,846,627 | 8/1958 | Doughty | 317—242 |
| 2,948,838 | 8/1960 | Obenhaus | 317—260 X |
| 2,995,688 | 8/1961 | Rosenberg | 317—258 |
| 3,048,750 | 8/1962 | Netherwood | 317—258 |
| 3,275,914 | 9/1966 | Hoffman | 317—258 |

FOREIGN PATENTS

| 338,806 | 8/1930 | Great Britain. |

OTHER REFERENCES

German printed application No. 1,117,765 to Telefunken, published 11–1961.

APC Application of Beckett, S.N. 218,848, published 6–8–1943.

Condensed Chemical Dictionary, Reinhold, sixth edition, 1961, pp. 1224–25.

ELLIOT A. GOLDBERG, Primary Examiner

U.S. Cl. X.R.

317—260

UNITED STATES PATENT OFFICE
CERTIFICATE OF CORRECTION

Patent No. 3,508,128

April 21, 1970

William M. Allison

It is certified that error appears in the above identified patent and that said Letters Patent are hereby corrected as shown below:

Column 2, line 19, "asosciation" should read -- association -- line 20, "is", second occurrence, should read -- in --. Column 4, line 6, after "that" insert -- the --; line 15, "electroles" should read -- electrodes --; line 25, "sail" should read -- said --; line 46, "reconstitutel" should read -- reconstituted --; under References Cited - FOREIGN PATENTS - "338,806" should read -- 333,806 --.

Signed and sealed this 29th day of December 1970.

(SEAL)
Attest:

Edward M. Fletcher, Jr.
Attesting Officer

WILLIAM E. SCHUYLER, JR.
Commissioner of Patents